2,789,099
Patented Apr. 16, 1957

2,789,099

POLYMERIZATION OF ACRYLIC ACID IN AQUEOUS SOLUTION

Howard M. Rife, Charleston, and Alexander H. Walker, South Charleston, W. Va., assignors to Union Carbide and Carbon Corporation, a corporation of New York No Drawing. Application September 4, 1953, Serial No. 378,687

9 Claims. (Cl. 260—29.6)

This invention relates to an improved process for polymerizing acrylic acid to yield water-soluble polymeric products which are particularly characterized in that aqueous solutions thereof do not tend to gel on prolonged storage.

It is known that acrylic acid dissolved in water can be polymerized by heating such aqueous solutions, the polymerization being greatly accelerated by having present in the aqueous reaction system a small amount of an oxygen yielding catalyst such as hydrogen peroxide, sodium peroxide, persulphuric acid, and water-soluble persulphates such as the ammonium, sodium and potassium salts of persulphuric acid. Depending on the reaction conditions, including temperature and time, it has been reported that acrylic acid can be polymerized to form polymers of at least 100 monomeric units and upwards, and that the water-solubility of such polymers is directly related to the average molecular size, those of low average molecular weight being readily soluble in water to yield solutions of low viscosity, whereas higher average molecular weight polymers form highly viscous aqueous solutions, or may merely swell in water to rubber-like masses.

For many technical applications of polyacrylic acid such as textile and paper sizing, printing pastes, adhesives and other related uses, it is often desirable to use aqueous solutions of polyacrylic acid of low viscosity for any given solids content to facilitate application of the polyacrylic acid to the material being treated therewith.

A further requirement of such aqueous solutions is that they do not appreciably increase in viscosity or gel on prolonged storage, e. g. up to twelve months or even more. Hertofore, it was known that water-soluble polyacrylic acid resulted from polymerizing acrylic acid at temperatures higher than 115° C., but the aqueous solutions of such polymers would often gel to a solid rubbery mass within as little as seven days storage at room temperature.

A further problem encountered in peroxide catalyzed aqueous polymerizations of acrylic acid is the difficulty of obtaining in batch to batch operations an acrylic acid polymer of substantially consistent viscosity values.

Accordingly, it is an object of the present invention to provide a method for polymerizing acrylic acid in aqueous systems containing a water-soluble peroxide catalyst which yields water-soluble acrylic acid polymers having substantially no tendency to gel in aqueous solutions on prolonged storage at average room temperatures.

Another object of the invention is to provide a method for polymerizing acrylic acid in aqueous systems which in batch to batch operations produces acrylic acid polymers having substantially consistent desired viscosity values as measured in aqueous solutions.

Other objects of the invention will appear hereinafter.

In accordance with the present invention, these objects are attained by polymerizing acrylic acid monomer in aqueous solution containing a water-soluble peroxide catalyst, which is preferably hydrogen peroxide, and a small amount of an agent capable of controlling the polymerization reaction to yield only water-soluble acrylic acid polymers, said agent being either a water-soluble cupric salt or a water-soluble alkali metal hypophosphite, or both.

The amount of control agent present in the polymerization system has a critical and consistent effect as regards the viscosity of the resultant acrylic acid polymer measured in aqueous solutions, polymers of high viscosity being obtained when the amount of control agent is at a minimum and polymers of progressively lower viscosity being obtained as the amount of control agent is increased.

Specific water-soluble cupric salts found operable as control agents for the polymerization of acrylic acid include among others cupric acetate monohydrate, cupric lactate, cupric formate, cupric chloride, cupric sulfate, cupric nitrate and cupric selenate.

Specific water-soluble alkali-metal hypophosphite that are effective as control agents are potassium hypophosphite and particularly sodium hypophosphite.

Generally, a given quantity of a cupric salt is much more effective in producing water-soluble polyacrylic polymers of lower average molecular weight as determined by viscosity measurements on an aqueous solution of the polymer than is the same or higher quantities of an alkali metal hypophosphite. For example, acrylic acid substantially completely polymerized in aqueous solution in the presence of hydrogen peroxide as catalyst and 0.1% by weight of cupric acetate on the weight of acrylic acid monomer yielded an aqueous solution which at 27.6% polymer solids content had a viscosity of 252 centipoises (20° C.), but acrylic acid monomer when subjected to the same polymerizing conditions, except using 1.0% by weight of sodium hypophosphite as a polymerization control agent yielded an acrylic acid polymer which at 29% polymer solids in an aqueous solution had a viscosity of 7,980 centipoises (20° C.). Otherwise stated, to produce a water-soluble acrylic acid polymer of any particular viscosity value as measured in water, a much larger amount of alkali metal hypophosphite is required to be present in the reaction system than is required in the instance of using a cupric salt as the polymerization control agent.

Although either the cupric salt or the alkali metal hypophosphite may be used alone in controlling the polymerization of acrylic acid to form water-soluble polymers, it has been found that when both salts are used conjointly, a synergistic effect is obtained in that the total quantity of both types of salt needed to obtain a water-soluble acrylic acid polymer of a desired viscosity value is considerably less than that required to obtain the same viscosity grade of polymer by the use of either the cupric salt or the alkali metal hypophosphite alone.

Both the cupric salts, and the alkali metal hypophosphites, alone or in combination appear to function as chain transfer agents or "degraders" for the growing polymer chain by transfer of the free radical on the end of the polymer chain to the salt, thus reducing the average molecular weight of the polymer being formed, but without substantially affecting the rate of polymerization.

Complete conversion of all the acrylic acid monomer to polymer is generally obtained with the use of an alkali metal hypophosphite, whether with or without the copresence of a cupric salt control agent. However, when a cupric salt is used as the sole control agent, some inhibiting action on acrylic acid polymerization has been observed as evidenced by the presence of larger amounts of unreacted or free monomer in the reaction system upon termination of the reaction than that noted in the use of alkali metal hypophosphites alone or in combination with a cupric salt.

The average molecular weight of the polyacrylic acid which is formed, is substantially directly dependent upon the amount of the particular salt used in the reaction, that is, as the amount of any given salt is increased, with other conditions constant, the lower the molecular weight of the resultant polymer.

Acrylic acid polymers of low enough average molecular weight to be soluble in water can be obtained by polymerizing the acrylic acid monomer in an aqueous system containing water-soluble peroxide catalyst and a quantity of alkali metal hypophosphite of at least about 0.1% by weight of the acrylic acid monomer. Higher amounts of this type salt, for example up to about 2% or more on the weight of the acrylic acid monomer can be used when still lower molecular weight acrylic acid polymers are desired.

As noted before, the cupric salts on a weight basis are more effective than the hypophosphite salts in promoting the production of water-soluble, low molecular weight acrylic acid polymer. For example, in the instance of cupric acetate monohydrate used alone, a quantity thereof equivalent to 0.05% by weight of the acrylic acid monomer is sufficient to control the acrylic acid polymerization to yield a water-soluble polymer. When a cupric salt is used in conjunction with an alkali metal hypophosphite, the cupric salt can constitute a quantity as small as 0.001 percent of the acrylic acid monomer.

The peroxide catalyzed polymerization of acrylic acid in water solution and in the presence of any of the control agents herein described are preferably conducted at temperatures between 60° C. and up to the boiling point of water-acrylic acid solution at atmospheric pressure (101.8° C.) are satisfactory. While polymerization temperatures higher than 101.8° C. can be used by resorting to pressure reactions, ordinarily no practical advantage is obtained thereby. In general, the higher the polymerization temperature for any specific amount of peroxide catalyst and polymerization control agent, the lower the average molecular weight of the resultant acrylic acid polymer.

At polymerization temperatures below 60° C., induction periods are increased, higher viscosity aqueous solutions result from the use of the same concentration of polymerization control agent, thus requiring more control agent to effect production of polymeric having the desired viscosity, and conversion of monomer to polymer or yields are poorer.

Ordinary tap water may be used as the solvent for the acrylic acid monomer in the polymerization reaction, but as such water normally contains many ionic contaminants, and as these have been found to lower the viscosity of the polymer solution, distilled water is preferred, particularly where reproducibility of polymer properties is desired in batch to batch operations.

The amount of water required to satisfactorily carry out the polymerization reaction can vary from about 200 to about 900 parts per 100 parts by weight of acrylic acid monomer. A preferred ratio is about 72 parts of water per 28 parts of acrylic acid monomer since the solutions which result are more workable and better dispersion of unreacted monomer is effected. Thus, the monomer is more readily made to come in contact with the catalyst and thereby effect polymerization more completely and readily.

The content of peroxide catalyst in the reaction system necessary to catalyze the polymerization reaction can be as little as 0.1% by weight of the acrylic acid monomer or as much as 1 to 2 percent by weight depending on the speed of reaction desired.

While it has been found unnecessary to purge the system with nitrogen to effect polymerization or to obtain good conversion to polymer, a slight nitrogen purge has been found most effective in reducing the induction period to about 5 minutes when the polymerization is conducted at 80° C. or lower. Normally, in this temperature range, 0.5 hour to 1.5 hours is required for induction when nitrogen is omitted. At reflux temperatures, however, the reaction begins rapidly upon addition of catalyst even though no nitrogen purge is employed.

In the subsequent examples a ratio of 28 parts acrylic acid monomer to 72 parts water has been used consistently, and this was done primarily to establish a constant condition as to this factor, to thereby more specifically show the effect of different amounts of alkali metal hypophosphite and cupric salt in controlling the polymerization reaction. Hydrogen peroxide was also employed in all the examples for substantially the same reason, however, other conventional water-soluble peroxide type catalysts hitherto recommended for the polymerization of acrylic acid can be used with equivalent results.

The following examples illustrate the process of the present invention, but they are not intended to limit it thereto:

EXAMPLE 1

772 gm. of distilled water containing 1.5 gm. (0.5 percent, monomer basis) of sodium hypophosphite monohydrate and 4.0 cc. of 30 percent hydrogen peroxide was heated to 88° C. at atmospheric pressure under mild agitation. 300 gm. of glacial acrylic acid was added over a period of 10 minutes. The temperature of the system dropped to 75° C. Steam was applied, and the temperature rose to 101.8° C. within one hour. The resultant aqueous polymer solution had a total solids content of 29.5 percent and an absolute viscosity, 20° C., of 60,500 centipoises. No substantial change in viscosity of the aqueous solution took place after storage at room temperature for one year.

EXAMPLE 2

1200 gm. of glacial acrylic acid was polymerized at atmospheric pressure and at 74° C. under mild agitation, in 3118 gm. of aqueous solution containing 12.0 gm. (1.0 percent, monomer basis) of sodium hypophosphite monohydrate and 18.0 gm. of a 30 percent solution of hydrogen peroxide. No nitrogen-purging was employed. After an induction period of 30 minutes, the temperature of the kettle rose to 101.8° C. within one minute. Steam heat was applied externally to the system for one hour. The resulting polymer solution had a total solids content of 28.7 percent, an unreacted monomer content of 0.79 percent, and an absolute viscosity, 20° C., of 7980 centipoises. No substantial change in viscosity of the aqueous solution was observed after extended storage (over 300 days) at room temperature.

EXAMPLE 3

250 gm. of glacial acrylic acid was polymerized at atmospheric pressure, under mild agitation, in 647 gm. of solution (distilled water) containing 0.25 gm. (0.1 percent, monomer basis) of sodium hypophosphite monohydrate and 0.047 gm. (0.019 percent, monomer basis) of cupric acetate monohydrate as chain-transfer agent combination, and 3.75 cc. (0.5 percent, monomer basis) of 30 percent hydrogen peroxide as catalyst. The mixture was heated externally with steam. Polymerization commenced when the temperature of the reactants reached 82.5° C.; whereupon, the application of steam was continued for one hour. A homogeneous solution resulted which had a total solids of 29 percent, an unreacted monomer content of 0.20 percent, a conversion to polymer of 99.3 percent, and an absolute viscosity, 20° C., of 6270 centipoises.

EXAMPLE 4

250 gm. of glacial acrylic acid was polymerized at atmospheric pressure under mild agitation with no nitrogen-purging, in 647 gm. of solution (distilled water) containing 0.25 gm. (0.1 percent, monomer basis) of sodium hypophosphite monohydrate, 0.055 gm. (0.022 percent, monomer basis) of cupric acetate monohydrate as chain-transfer agent combination, and 3.75 cc. (0.5 percent, monomer basis) of 30 percent hydrogen peroxide as catalyst. The mixture was heated externally with steam. Polymerization commenced when the temperature of the reactants reached 80° C.; whereupon, the application of steam was continued for one hour. A homogeneous solution resulted which had a total solids of 28.3 percent, an unreacted monomer content of 0.48 percent, a conversion to polymer of 98.2 percent, and an absolute viscosity, 20° C. of 3600 centipoises.

EXAMPLE 5

250 gm. of glacial acrylic acid was polymerized at atmospheric pressure under mild agitation in 647 gm. of solution (distilled water) containing 0.25 gm. (0.1 percent, monomer basis) of sodium hypophosphite monohydrate and 0.065 gm. (0.026 percent, monomer basis) of cupric acetate monohydrate as chain-transfer agent combination and 3.75 cc. (0.5 percent, monomer basis) of a 30 percent solution of hydrogen peroxide as catalyst. The mixture was heated externally with steam. Polymerization commenced when the temperature of the reactants reached 80.5° C.; whereupon the application of steam was continued for one hour. A homogeneous solution resulted which had a total solids of 28.4 percent, an unreacted monomer content of 0.44 percent, a conversion to polymer of 98.4 percent, and an absolute viscosity, 20° C. of 1622 centipoises.

EXAMPLE 6

250 gm. of glacial acrylic acid was polymerized at atmospheric pressure under mild agitation in 647 gm. of solution (distilled water) containing 0.25 gm. (0.1 percent, monomer basis) of sodium hypophosphite monohydrate and 0.075 gm. (0.030 percent, monomer basis) of cupric acetate monohydrate as chain-transfer agent combination and 3.75 cc. (0.5 percent, monomer basis) of a 30 percent solution of hydrogen peroxide. The mixture was heated externally with steam. Polymerization commenced when the temperature of the reactants reached 80° C.; whereupon, the application of steam was continued for one hour. A homogeneous solution resulted which had a total solids of 27.4 percent, an unreacted monomer content of 0.15 percent, a conversion to polymer of 99.5 percent, and an absolute viscosity, 20° C. of 1036 centipoises.

EXAMPLE 7

250 gm. of glacial acrylic acid was polymerized at atmospheric pressure under mild agitation in 647 gm. of solution (distilled water) containing 0.25 gm. (0.1 percent, monomer basis) of sodium hypophosphite monohydrate and 0.125 gm. (0.05 percent, monomer basis) of cupric acetate monohydrate as chain-transfer agent combination and 3.75 cc. (0.5 percent, monomer basis) of a 30 percent solution of hydrogen peroxide. The mixture was heated externally with steam. Polymerization commenced when the temperature of the system reached 90° C.; whereupon, the application of steam was continued for one hour. A homogeneous solution resulted which had a total solids of 26.1 percent, an unreacted monomer content of 0.37 percent, a conversion to polymer of 98.5 percent, and an absolute viscosity, 20° C. of 217 centipoises.

EXAMPLE 8

Glacial acrylic acid (28 parts) and distilled water (72 parts) were charged, together with hydrogen peroxide (0.5 percent, monomer basis) to two necked-down Carius tubes. Cupric acetate monohydrate, in concentrations of 0.10 percent and 0.05 percent, was added to the respective solutions. The tubes were purged 0.5 minute with nitrogen, sealed, and heated 3.5 hours at 80° C. The following data were obtained on the resultant aqueous polymer solutions:

| Sample | A | B |
|---|---|---|
| Ratio, monomer/solvent | 28/72 | 28/72 |
| Cupric acetate monohydrate, monomer basis, percent | 0.1 | 0.05 |
| Total polymeric solids, percent | 27.6 | 28.0 |
| Unreacted monomer content, percent | 1.11 | 0.70 |
| Conversion to polymer, percent | 96.1 | 97.6 |
| Absolute viscosity, 20° C., centipoises | 252 | 208 |

EXAMPLE 9

A series of 6 polymerizations of glacial acrylic acid was conducted at atmospheric pressure in a constant temperature bath maintained at 80° C.±0.01° C. according to the following procedure:

250 gm. of glacial acrylic acid was added to 647 gm. of solution (distilled water) containing 0.50 gm. (0.2 percent, monomer basis) of sodium hypophosphite monohydrate, and various minute quantities of cupric acetate monohydrate. The resulting solution was subjected to mild agitation in a three-necked, 2-liter reaction flask and placed in the constant temperature bath. After the reactants had come to temperature, 3.75 cc. (0.5 percent, monomer basis) of a 30 percent solution of hydrogen peroxide was added. The system was purged with nitrogen for a period of three hours, and the respective samples were withdrawn for analysis (nitrogen-purging reduced the initial induction period, which ranged from 0.5 hour to 1.5 hours, to approximately 5.0 minutes).

Table I tabulates the results obtained for the various runs (together with the charges used).

Table I

| Sample | 1 | 2 | 3 | 4 | 5 | 6 |
|---|---|---|---|---|---|---|
| Ratio, monomer/water | 28/72 | 28/72 | 28/72 | 28/72 | 28/72 | 28/72 |
| Sodium hypophosphite monohydrate, monomer basis, percent | 0.2 | 0.2 | 0.2 | 0.2 | 0.2 | 0.2 |
| Cupric acetate monohydrate, monomer basis, percent | 0.020 | 0.025 | 0.030 | 0.040 | 0.050 | 0.080 |
| Total solids, percent | 29.0 | 26.2 | 28.0 | 27.7 | 28.4 | 26.2 |
| Unreacted monomer content, percent | 0.09 | 0.16 | 0.12 | 0.09 | 0.10 | 0.37 |
| Conversion to polymer, percent | 99.8 | 99.5 | 99.6 | 99.7 | 99.8 | 98.6 |
| Absolute viscosity, 20° C., centipoises | 9,060 | 1,574 | 1,345 | 1,092 | 562 | 141 |

EXAMPLE 10

A series of eight polymerizations of glacial acrylic acid was conducted at atmospheric reflux temperature according to the following procedure:

250 gm. of glacial acrylic acid was polymerized at atmospheric pressure and at reflux under mild agitation in a solution (distilled water) containing 0.5 gm. of sodium hypophosphite monohydrate (0.2 percent, monomer basis) and various quantities of cupric acetate monohydrate. No nitrogen-purging was employed. Hydrogen peroxide (0.1 percent, monomer basis) was added. Polymerization commenced immediately. The source of heat was removed as the exothermic reaction progressed. A second charge of catalyst (0.2 percent, monomer basis) was furnished, and the mixture in each instance was heated externally at reflux for one hour to produce a homogeneous solution.

Table II tabulates the results obtained from the use of different amounts of cupric acetate monohydrate and a fixed amount of sodium hypophosphite monohydrate,

Table II

| Sample | 1 | 2 | 3 | 4 | 5 | 6 | 7 | 8 |
|---|---|---|---|---|---|---|---|---|
| Ratio monomer/water | 28/72 | 28/72 | 28/72 | 28/72 | 28/72 | 28/72 | 28/72 | 28/72 |
| Sodium hypophosphite monohydrate, monomer basis, percent | 0.2 | 0.2 | 0.2 | 0.2 | 0.2 | 0.2 | 0.2 | 0.2 |
| Cupric acetate monohydrate, monomer basis, percent | 0.00 | 0.012 | 0.014 | 0.016 | 0.02 | 0.024 | 0.028 | 0.032 |
| Total solids, percent | 32.0 | 28.3 | 27.9 | 28.1 | 27.9 | 27.8 | 28.2 | 28.6 |
| Unreacted monomer content, percent | 0.84 | 0.15 | 0.16 | 0.17 | 0.12 | 0.16 | 0.19 | 0.25 |
| Conversion to polymer, percent | | 99.8 | 99.5 | 99.5 | 99.5 | 99.4 | 99.4 | 99.2 |
| Absolute viscosity 20° C., centipoises | 100,000 | 8,100 | 4,400 | 4,000 | 1,700 | 1,380 | 1,300 | 690 |

The water-soluble acrylic acid polymers prepared according to the present invention have utility as textile sizings, as soil stabilizers, as adhesives, and as emulsifiers. Since the viscosity of polyacrylic acid aqueous solutions is often of technical importance in such applications, the present invention enables the consistent production of reproducible viscosity values by suitable choice of the amount of control agent present in the polymerization reaction system as hereinbefore shown.

We claim:

1. Process for the preparation of stable aqueous solutions of polyacrylic acid which comprises polymerizing acrylic acid monomer in an aqueous solution containing a water-soluble peroxide catalyst and a small amount of polymerization control agent consisting of water-soluble cupric salts selected from the group consisting of cupric acetate monohydrate, cupric lactate, cupric formate, cupric chloride, cupric sulfate, cupric nitrate and cupric selenate and water-soluble alkali metal hypophosphites, said amount being at least 0.05% by weight of the monomer in the instance of the cupric salts and at least 0.1% by weight of the monomer in the instance of the hypophosphites.

2. Process for the preparation of stable aqueous solutions of polyacrylic acid which comprises polymerizing at a temperature between 60 and 102° C. acrylic acid monomer in an aqueous solution containing a water-soluble peroxide catalyst and a small amount of a water-soluble cupric salt selected from the group consisting of cupric acetate monohydrate, cupric lactate, cupric formate, cupric chloride, cupric sulfate, cupric nitrate and cupric selenate, said amount being at least 0.05% by weight of the monomer.

3. Process for the preparation of stable aqueous solutions of polyacrylic acid which comprises polymerizing at a temperature between 60 and 102° C. acrylic acid monomer in an aqueous solution containing a water-soluble peroxide catalyst and a small amount of a water-soluble alkali meltal hypophosphite, said amount being at least 0.1% by weight of the monomer.

4. Process for polymerizing acrylic acid which comprises heating to a temperature between 60° and 102° C. in the presence of a water-soluble peroxide catalyst an aqueous solution of acrylic acid monomer containing per 100 parts by weight of monomer between 0.05 and 1.0 part by weight of an alkali metal hypophosphite, and between 0.0001 and 0.1 of a water-soluble cupric salt selected from the group consisting of cupric acetate monohydrate, cupric lactate, cupric formate, cupric chloride, cupric sulfate, cupric nitrate and cupric selenate, until substantially all the acrylic acid has polymerized.

5. Process for preparing water-soluble polymers of acrylic acid which comprises mixing together 100 parts by weight of acrylic acid monomer, from 200 to 900 parts by weight of water, from 0.05 to 1.0 part by weight of sodium hypophosphite, from 0.0001 to 0.1 part of a water-soluble cupric salt selected from the group consisting of cupric acetate monohydrate, cupric lactate, cupric formate, cupric chloride, cupric sulfate, cupric nitrate and cupric selenate and from 0.1 to 2.0 parts by weight of a water-soluble peroxide catalyst, and heating the mixture to a temperature between 60 and 102° C. to cause polymerization of the acrylic acid monomer.

6. Process for the preparation of stable aqueous solutions of polyacrylic acid which comprises polymerzing at a temperature between 60° C. and 102° C. acrylic acid monomer in an aqueous solution containing a water-soluble peroxide catalyst and a water-soluble, cupric salt selected from the group consisting of cupric acetate monohydrate, cupric lactate, cupric formate, cupric chloride, cupric sulfate, cupric nitrate and cupric selenate in amount at least 0.05% by weight of the acrylic acid monomer.

7. A process for polymerizing acrylic acid to form water-soluble polyacrylic acids which comprises heating to between 60° C. and 102° C. an aqueous solution of acrylic acid monomer containing a water-soluble peroxide catalyst and at least 0.05 part by weight of cupric acetate monohydrate per 100 parts monomer until substantially all the monomer has polymerized.

8. A process for polymerizing acrylic acid to form water-soluble polyacrylic acids which comprises heating to between 60° C. and 102° C. an aqueous solution of acrylic acid containing a water-soluble peroxide catalyst and at least 0.1 part by weight of sodium hypophosphite monohydrate per 100 parts acrylic acid monomer, until substantially all the acrylic acid monomer has polymerized.

9. A process for polymerizing acrylic acid to form water-soluble polyacrylic acids which comprises heating to between 60° C. and 102° C. an aqueous solution of 100 parts by weight acrylic acid monomer, said solution containing hydrogen peroxide as a polymerization catalyst, between 0.05 part and 1.0 part by weight of sodium hypophosphite monohydrate, and between 0.0001 and 0.1 part of cupric acetate monohydrrate, until substantially all the acrylic acid has polymerized.

References Cited in the file of this patent

UNITED STATES PATENTS

| 2,289,540 | Dittmar, et al. | July 14, 1942 |
| 2,383,425 | Stewart | Aug. 21, 1945 |